Sept. 21, 1948. L. SCHWORM, JR 2,449,723
BOTTLE WARMING DEVICE
Filed Aug. 30, 1945

INVENTOR.
LOUIS SCHWORM JR.
BY
ATTORNEY

Patented Sept. 21, 1948

2,449,723

UNITED STATES PATENT OFFICE 2,449,723

BOTTLE WARMING DEVICE

Louis Schworm, Jr., Washington, D. C.

Application August 30, 1945, Serial No. 613,598

3 Claims. (Cl. 219—38)

This invention relates to a heating appliance and has relation more particularly to means for maintaining warm a liquid, such as milk in a suitable receptacle, for use in connection with the feeding of infants or in a sick room.

The invention consists in the details of construction and in the combination and arrangement of the several parts of my improved heating appliance whereby certain important advantages are attained, as will be hereinafter more fully set forth.

Figure 1:
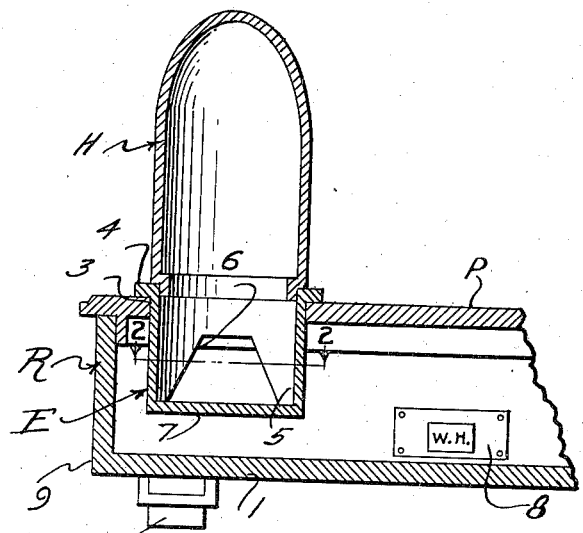
Figure 2:
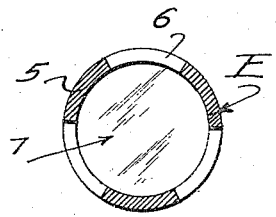

In order that my invention may be better understood, I will now proceed to describe the same with reference to the accompanying drawings, wherein:

Figure 1 is a fragmentary sectional view illustrating a heating appliance constructed in accordance with an embodiment of the invention; and Figure 2 is a sectional view taken substantially on the line 2—2 of Figure 1.

As disclosed in the accompanying drawings, R denotes a receptacle of any suitable material, preferably of glass, and which has depending from its bottom wall 1 suitably positioned supporting feet 2.

The open top of the receptacle R is adapted to be tightly closed by a plate or lid P which may also serve as a tray when desired. This plate or lid P is preferably of the same material as the receptacle R although I do not wish to be understood as limiting myself in this respect.

At a suitable point thereon the plate or lid P is provided with an opening 3 of relatively large diameter through which is adapted to be inserted from above a cup-like container E. This container E has its top open and said open top portion is surrounded by an outstanding flange 4, the under face of which is machined or otherwise finished to insure close contact with the top surface of the plate or lid P. This top surface is preferably polished or otherwise finished to assure an effective sealing of the opening 3 after the container E has been properly inserted therethrough.

Associated with the container E is an elongated cap H which snugly seats from above upon the container E and in a manner to afford a tight fit between the container E and applied cap H. A bottle of milk or the like is adapted to be positioned in the container E, after which the cap H is applied, said cap H being elongated and of such dimensions to assure effective housing of such bottle.

The side wall 5 of the container E in that portion which, when the container E is in required applied position on the plate or lid P below such plate or lid or within the receptacle R, is provided with the relatively large openings 6 to permit the admission into the chamber, afforded by the container E and the applied cap H, of steam or vapor generated within the receptacle R to maintain warm the content of the bottle or the like housed within the container E and the applied cap H.

In practice, water is placed within the receptacle R to a depth of about one-half of the depth of the receptacle and it will be noted that the container E is of a depth to extend slightly below such water level. It is also to be pointed out that the openings 6 extend from immediately adjacent the bottom wall 7 of the container E to a point above the vertical center of the container. An opening of this kind will allow a certain amount of water to enter the container E but further and particularly assures the admission of the desired vapor or steam.

The water within the receptacle R may be heated in any manner but as illustrated in the accompanying drawings, such heating is effected through the use of a conventional electric heater 8 carried by a side wall 9 of the receptacle R and below the vertical center thereof so that said heater 8 will be in submergence.

From the foregoing description it is thought to be obvious that a heating appliance constructed in accordance with my invention is particularly well adapted for use by reason of the convenience and facility with which it may be assembled and operated.

I claim:

1. A bottle warming device of the character stated comprising a receptacle, means for heating liquid therein, a cover for said receptacle, said cover having an opening therein, a cup-like container insertable through said opening to extend into the receptacle, said container having a wall opening to admit liquid and steam from the receptacle into the container, the container having an encircling top flange, said flange and container being formed for the establishment of a relatively tight engagement between their opposing surfaces, the container being designed to receive a bottle, and a relatively long cover adapted to enclose said bottle and having tight detachable connection with the container.

2. A bottle heating device of the character stated in claim 1, wherein said cover has a reduced extension at the end adjacent to the container, said extension being insertable into the top of the container and forming a relatively tight connection therewith.

3. A bottle warming device of the character stated comprising a relatively shallow receptacle, a substantially flat cover for the receptacle, the cover having a flange portion engaging within the receptacle, the cover further having an opening, a cup-like container of an overall diameter substantially equaling the diameter of said opening and adapted to extend through the opening into the receptacle, said container extending into the receptacle through the major part of the depth of the receptacle, the container having a wall opening for the admission thereinto of liquid and steam from the receptacle, a flange encircling the top of the container and engaging upon the top surface of the container cover, the engaging faces of the flange and cover being of smooth finish to form a tight joint, and a bottle cover for the container comprising a relatively long hollow member having a reduced longitudinally extending wall portion adapted to engage within the top of the container whereby to form a relatively tight joint between the last named cover and the container, the upper end of the last named cover being closed, said last named cover being of a length to enclose the upper part of a bottle supported in the container.

LOUIS SCHWORM, Jr.

REFERENCES CITED

The following references are of record in the file of this patent:

UNITED STATES PATENTS

| Number | Name | Date |
| --- | --- | --- |
| 1,344,326 | Williams | June 22, 1920 |
| 1,560,893 | Bonoff | Nov. 10, 1925 |
| 1,792,434 | Lockwood | Feb. 10, 1931 |
| 1,860,302 | Thomas | May 24, 1932 |
| 1,944,365 | Patchell et al. | Jan. 23, 1934 |
| 2,235,911 | Wilcox | Mar. 25, 1941 |